(12) United States Patent
Hemena et al.

(10) Patent No.: US 6,320,771 B1
(45) Date of Patent: Nov. 20, 2001

(54) FAULT TOLERANT ACTIVE CURRENT SHARING

(75) Inventors: William Hemena, Raleigh; Randhir S. Malik, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,144

(22) Filed: Apr. 10, 2000

(51) Int. Cl.[7] ............................................ H02M 7/00
(52) U.S. Cl. ................................... 363/70; 323/272
(58) Field of Search ........................ 363/65, 69, 70, 363/71, 72, 95, 97, 98; 323/272

(56) References Cited

U.S. PATENT DOCUMENTS

| | | | |
|---|---|---|---|
| 4,924,170 | 5/1990 | Henze | 323/272 |
| 5,266,838 | 11/1993 | Gerner | 307/19 |
| 5,319,536 | 6/1994 | Malik | 363/65 |
| 5,745,670 | 4/1998 | Linde | 395/182.2 |
| 5,834,925 | 11/1998 | Chesavage | 323/272 |
| 6,118,674 | * 9/2000 | Higashi | 363/21 |

* cited by examiner

*Primary Examiner*—Peter S. Wong
*Assistant Examiner*—Gary L. Laxton
(74) *Attorney, Agent, or Firm*—Bracewell & Patterson, LLP

(57) ABSTRACT

A system and method for maintaining a balanced current level among multiple power supply modules within a parallel power supply. An external voltage is applied to an internal reference translator circuit within each of the parallel power supply modules, such that an internal current-sharing voltage reference is generated within each power supply module. An external reference translator circuit is biased by an independent voltage level, such that the external reference translator circuit generates an external current-sharing voltage reference that is maintained at a higher voltage level than the internal current-sharing voltage references generated within the parallel power supply modules. The external current-sharing voltage reference acts as a master current share reference with respect to which each of the internal current-sharing voltage references. A current adjustment circuit within each of the power supply modules compares the internal current-sharing voltage reference with the master current share reference and generates a current adjustment signal in response to detecting a voltage differential between the master current share reference and the internal current-sharing voltage reference, such that load-sharing is provided among the parallel power supply modules.

8 Claims, 4 Drawing Sheets

FAULT TOLERANT ACTIVE CURRENT SHARING

BACKGROUND OF THE INVENTION

1. Field of the Invention

The present invention relates in general to regulating power supplies, and in particular to a system and method for load-balancing within a parallel power supply. Still more particularly, the present invention relates to an open-loop system in which an external voltage source provides an independent reference for balancing a current load within a parallel power supply.

2. Description of Related Art

Conventional power supply systems often utilize multiple power supply circuits connected in parallel for improving load variation adaptability and increased reliability. Examples of such parallel power supply systems can be found in Malik, U.S. Pat. No. 5,319,536, Gerner, U.S. Pat. No. 5,266,838, and Line; U.S. Pat. No. 5,745,670.

Referring now to FIGS. 1, 2, and 3, conventional parallel power supply systems 101, 201, and 301 are illustrated. As shown in FIG. 1, parallel power supply system 101 includes two parallel power supply modules, PS1 102 and PS2 104 that provide independent sources of power to a system load 106. PS1 102 and PS2 104 generate output currents I1 108 and I2 110, respectively. Included among the advantages provided by the parallel configuration of power supply system 101 over a unitary power supply system are reduced power supply component costs, enhanced operational flexibility, and improved system reliability.

In the interest of uniformity of device stress and corresponding reduced device failure rates, it is desirable to maintain a balanced power output provided by parallel power sources such as PS1 102 and PS2 104. FIGS. 2 and 3 illustrate conventional systems for achieving such a balance under varying electrical loads.

As depicted in FIG. 2, power supply system 201 includes parallel power supply modules PS1 202 and PS2 204 that operate in a "droop" current sharing mode in supplying power to a system load 206. PS1 202 and PS2 204 maintain a required system voltage level, $V_{OUT}$ at a common output node 215. Decoupling diodes D1 212 and D2 214 serve as decoupling barriers between supply-side nodes 217 and 219 and common output node 215. In order to achieve the desired operating balance between PS1 202 and PS2 204, the current, I1, through node 217 should be approximately equal to the current, I2, flowing through node 219 (one half of the $I_T$ flowing through common output node 215).

As further illustrated in FIG. 2, power supply system 201 includes circuitry within each of the power supply modules 202 and 204 for maintaining a balance in the relative current load borne by each supply. The technique by which such current sharing is achieved in power supply system 201 is commonly referred to in the art as droop current sharing. As depicted in FIG. 2, PS1 202 and PS2 204 each include a variable resistor (R1 220 and R2 222 respectively) which serves as a setting and adjustment mechanism for the respective output voltages at nodes 217 and 219. Error amplifiers U1 224 and U2 226 are configured as negative feedback devices such that as the current drawn by system load 206 from PS1 202 and PS2 204 increases, the output voltage level at output node 215 decreases.

The current balancing achieved by the closed-loop voltage "droop" effect relies on very precise and symmetric device mirroring between the individual power supply modules PS1 202 and PS2 204. Such precision is costly and difficult to achieve. Dynamic variations in system load 206 further magnify imbalances between I1 and I2 and result in a wider tolerance required for current imbalance within power supply system 201.

FIG. 3 depicts an alternate closed-loop current sharing technique known in the art as "active current sharing." As illustrated in FIG. 3, power supply system 301 includes a pair of parallel power supply modules PS1 302 and PS2 304 each having a current sense resistor (R1 306 and R2 308). Active current sharing at current sharing feedback node 310 is achieved by utilizing the voltage references developed across R1 306 and R2 308. For example, if the voltage output of PS2 304 at supply-side node 314 is higher than that at supply-side node 312 within PS1 302, the voltage differential across current sense resistors R1 306 and R2 308 indicates that PS2 304 is providing the majority of the current to system load 306.

The imbalance causes the voltage drop across current sense resistor 308 to be higher than the voltage drop across current sense resistor 306. A higher voltage drop across R2 308 results in an increase in the voltage level at current share node 310. This increase in current share node 310 voltage will increase the driving voltages or amplifiers 316 and 317 and will force a higher current to flow through resistor 320 and transistor 318. An increased voltage drop across resistor 320 will result in a higher voltage at node 312. This process continues until both the power supplies PS1 302 and PS2 304 start current sharing. In this manner, whichever of PS1 302 or PS2 304 has a higher voltage becomes the master and the other become a slave.

The load balancing within power supply system 301 thus relies on closed-loop feedback provided between PS1 302 and PS2 304 at current sharing feedback node 310. A varying current through activated transistor 318 or transistor 319 develops an offset voltage across resistors 320 or 321 which causes the output voltage of PS1 302 or PS2 304 to increase until both PS1 302 and PS2 304 have equal output voltage levels and thus provide equal current to system load 306.

By providing feedback between each of its constituent power supply modules, the active current sharing system depicted in FIG. 3 provides a more accurately balanced current load between its respective power supply modules than the droop current sharing system depicted in FIG. 2. However, this active sharing method requires expensive overhead components and devices such as very precise and low resistance current sense resistors (R1 306 and R2 308), and low-offset amplifiers (U1 322 and U2 324) within each power supply module. This closed-loop feedback approach relies on interdependencies among parallel power supplies to ensure accurate load balancing. Low tolerance devices, such as amplifiers with very low offsets are required to achieve a reliable interdependence.

It would therefore be desirable to provide an system and method for maintaining an accurate load balance for parallel power supplies without relying on interdependent operating parameters among individual power supply modules.

SUMMARY OF THE INVENTION

A system and method are disclosed for maintaining a balanced current level among multiple power supply modules within a parallel power supply. An external voltage is applied to an internal reference translator circuit within each of the parallel power supply modules, such that an internal current-sharing voltage reference is generated within each power supply module. An external reference translator circuit is biased by an independent voltage level, such that the external reference translator circuit generates an external current-sharing voltage reference that is maintained at a higher voltage level than the internal current-sharing voltage references generated within the parallel power supply modules. The external current-sharing voltage reference acts as a master current share reference with respect to which each of the internal current-sharing voltage references. A current adjustment circuit within each of the power supply modules compares the internal current-sharing voltage reference with the master current share reference and generates a current adjustment signal in response to detecting a voltage differential between the master current share reference and the internal current-sharing voltage reference, such that load-sharing is provided among the parallel power supply modules.

DETAILED DESCRIPTION OF AN ILLUSTRATIVE EMBODIMENT

A current sharing controller system and method are disclosed herein for maintaining a balanced current load within a load sharing parallel power supply. As described in further detail with reference to the figures, the load sharing power supply includes multiple power supply modules, each providing an output current level to the total load current. An external voltage is applied to each of the power supply modules to generate an internal voltage reference level against which a higher voltage master reference is compared in order to achieve load balancing among the parallel power supply modules.

Figure 4:
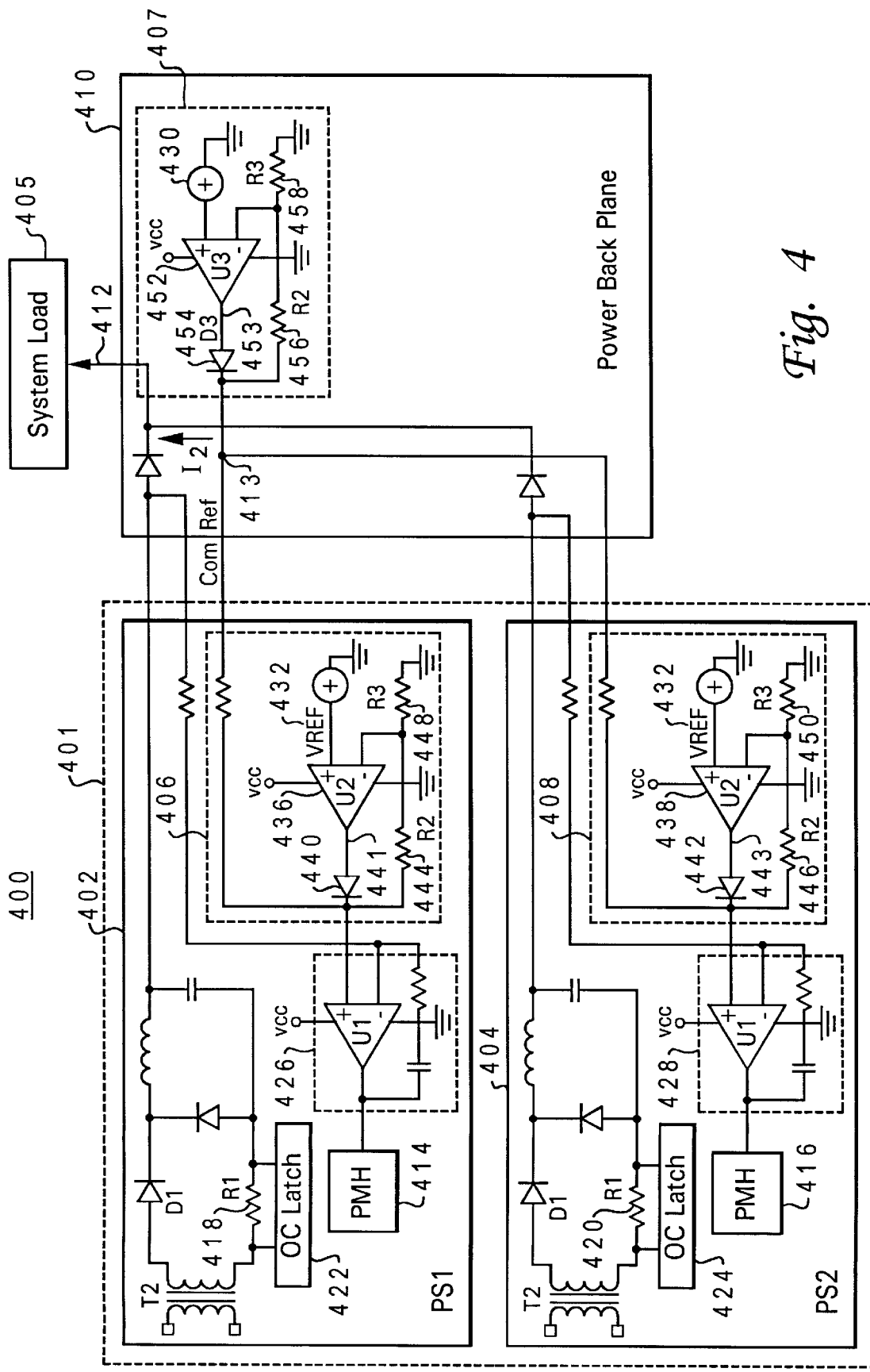
FIG. 4 is a schematic diagram illustrating an active load-sharing parallel power supply in accordance with a preferred embodiment of the present invention.

With reference now to FIG. 4, there is illustrated a power supply system 400 in accordance with a preferred embodiment of the present invention. As shown in FIG. 4, power supply system 400 includes a load-sharing parallel power supply 401, a master reference translator circuit 407, and a system load 405. Included within parallel power supply 401 are power supply modules PS1 402 and PS2 404. A system load bus 412 provides a total load current from PS1 402 and PS2 404 to system load 405.

Figure 1:
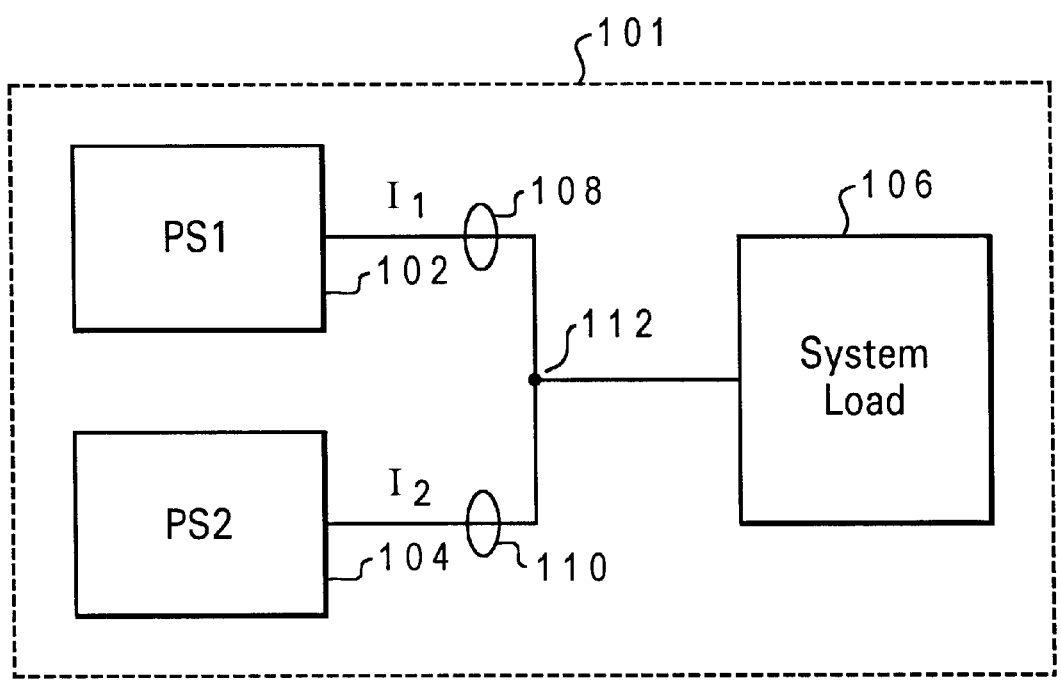
FIG. 1 is a block diagram depicting a load-sharing parallel power supply system.
Figure 2:
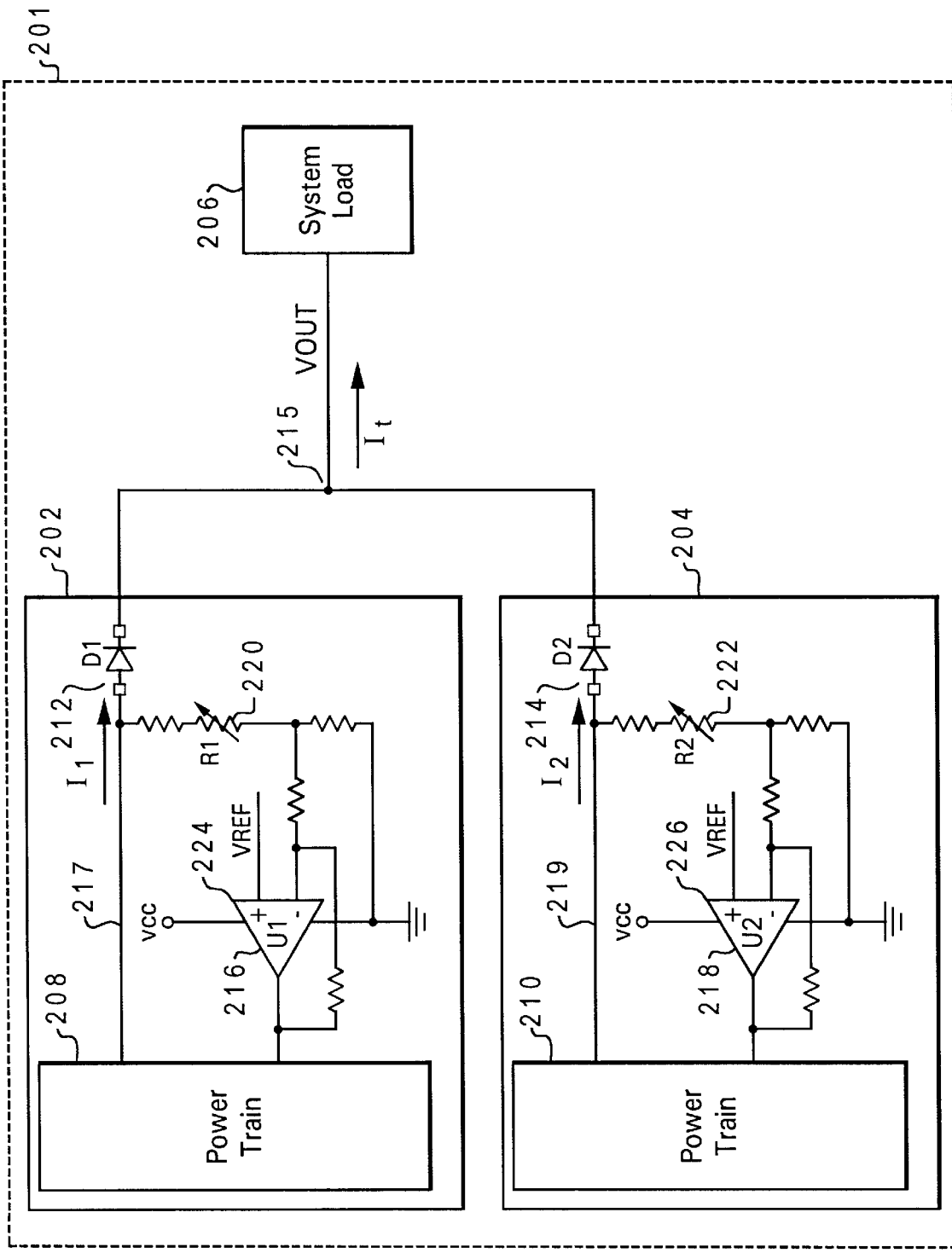
FIG. 2 is a schematic diagram illustrating a conventional droop load-sharing parallel power supply.

As illustrated in FIG. 4, PS1 402 and PS2 404 include slave reference translator circuits 406 and 408 respectively. In accordance with the embodiment depicted in FIG. 1, slave reference translator circuits 406 and 408 generate internal voltage references at nodes 441 and 443 within PS1 402 and PS2 404 respectively. As shown in FIG. 4, slave reference translator circuits 406 and 408 include amplifiers 436 and 438, decoupling diodes 440 and 442, representative reference networks 444 and 448, and 446 and 450, and a common voltage source ($V_{REF}$) 432.

Slave reference translator circuits 406 and 408 are utilized to generate reference outputs for PS1 402 and PS2 404 in case the common node reference 413 is not available due to a common fault condition. The dynamic voltage reference at common node 413 is controlled by master reference translator circuit 407. In the depicted embodiment, master reference translator circuit 407 is located within a power backplane 410 and is thus physically, as well as electrically, independent of any and all parallel power supply modules within load-sharing parallel power supply 401.

In the illustrated embodiment, master reference translator circuit 407 is similar in its essential construction to slave reference translator circuits 406 and 408. A master voltage reference 430 is connected to the non-inverting terminal of an operational amplifier (op-amp) 452, and a negative feedback network connected to its inverting terminal (R2 456 and R3 458) to generate a master reference equal to the output voltage of the power supply. Master reference translator circuit 407 translates an external voltage from external voltage source 430 into a master voltage reference 453.

In an important feature of the present invention, master voltage reference 453 is maintained at a slightly higher level (tenths of a volt) than the voltage at internal references at nodes 441 and 443, such master voltage reference 453 (applied across decoupling diode 454) controls the voltage level at common node 413. Master voltage reference 453 therefore ensures that master reference translator circuit 407 serves as an independent and controlling reference for parallel power supply modules PS1 402 and PS2 404.

In another important feature of the depicted embodiment, a current sharing controller within parallel power supply 400 includes internal voltage reference nodes 441 and 443 (within slave reference translator circuits 406 and 480 respectively) which are connected in parallel to the independent voltage reference as set by master reference translator circuit 407 at common node 413. Slave reference translator circuits 406 and 408 may independently generate output voltage levels in accordance with independent comparisons of the internal voltage references at nodes 441 and 443 to the independent voltage reference at common node 413.

The offset tolerance for amplifiers 436 and 438 are not a critical attribute of the load-sharing capability of parallel power supply 400. The output voltage of the power system is equal to the node voltage 413, which is generated by a combination of master voltage reference 430, offset voltage of offset amplifier 452, and the ratio of the resistance values of R2 456 and R3 458. As common reference 413 acts as a master for all power supplies in parallel, the output voltage of all sources in parallel is equal to this master voltage. The offset in error amplifier 452 and the error ratio of R2 456 and R3 458 is applicable to all the sources in parallel.

As illustrated in FIG. 4, PS1 402 and PS2 404 further include error amplifiers 426 and 428 which regulate pulse-width modulators (PWMS) 414 and 416 in accordance with the voltage level at common node 413. In this manner the output voltage level applied to system load bus 412 is maintained at a relative constant under varying load conditions.

Figure 3:
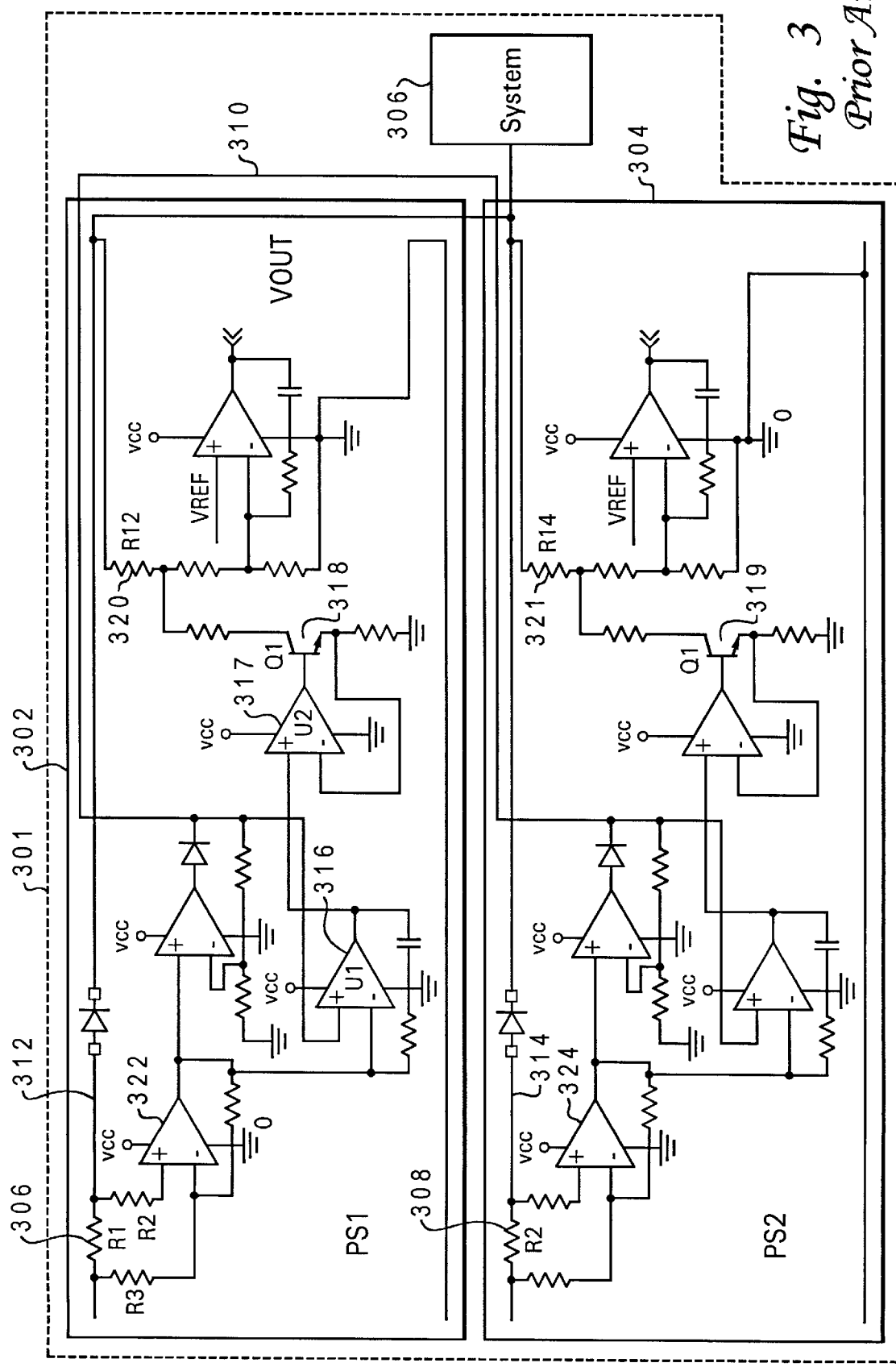
FIG. 3 is a schematic diagram depicting a conventional active load-sharing parallel power supply.

Similar to the active load-sharing configuration depicted in FIG. 3, parallel power supply modules PS1 402 and PS2 404 include sense resistors R1 418 and R1 420. It should be noted, however, that the fine tolerance requirements and linear characteristics required for R1 306 and R1 308 are not as critical for R1 418 and R1 420, which are utilized only for overcurrent protection rather than for load-sharing as in FIG. 3.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A circuit for maintaining a balanced output current level among each of a plurality of power supply modules that are connected in parallel to form a parallel power supply that supplies a single load, said circuit comprising:

a master reference voltage circuit that provides a master reference voltage level to said plurality of parallel power supply modules at a common load adjustment reference node;

a load adjustment amplifier within each of said plurality of parallel power supply modules, wherein each of said load adjustment amplifiers compares an output voltage from its corresponding power supply module with said master reference voltage level and adjusts an output current from its corresponding power supply module in response thereto; and an internal reference circuit within each of said plurality of power supply modules, said internal reference circuit comprising:

a first voltage source; and an amplifier that compares said master reference voltage level at said common load adjustment reference node with a voltage level from said first voltage source to generate an internal reference voltage level applicable to said common voltage adjustment node, wherein said internal reference voltage level is maintained lower than said master reference voltage level.

2. The circuit of claim 1, wherein said master reference voltage circuit comprises an independent voltage source that is maintained at a higher voltage level than said internal reference voltage level within each of said power supply modules.

3. The circuit of claim 1, wherein each of said load adjustment amplifiers further comprise an operational amplifier configured to detect and amplify a voltage differential between an output voltage from its corresponding power supply and said master reference voltage level.

4. A parallel power supply, comprising:

a plurality of parallel power supply modules, wherein each of said plurality of parallel power supply modules contributes an output current level to a common electrical load;

a master reference voltage circuit that provides a master reference voltage level to said plurality of power supply modules at a common load adjustment reference node;

a load adjustment amplifier within each of said plurality of parallel power supply modules, wherein each of said load adjustment amplifiers compares an output voltage from its corresponding parallel power supply module with said master reference voltage level and adjusts an output current from its corresponding parallel power supply module in response thereto; and an internal reference circuit within each of said plurality of power supply modules, said internal reference circuit comprising:

a first voltage source; and an amplifier that compares said master reference voltage level at said common load adjustment reference node with a voltage level from said first voltage source to generate an internal reference voltage level applicable to said common load adjustment reference node, wherein said internal reference voltage level is maintained lower than said master reference voltage level.

5. The parallel power supply of claim 4, wherein said master reference voltage adjustment circuit comprises an independent voltage source for maintaining said master reference voltage level higher than said internal reference voltage level.

6. The parallel power supply of claim 4, further comprising a barrier device coupled between said common load adjustment reference node and an output terminal of each amplifier within each of said internal reference circuits such that a failure of said parallel power supply due to a failure within said external voltage source is prevented.

7. A current sharing method for maintaining a balanced current level among a plurality of power supply modules that are connected in parallel to form a parallel power supply that supplies a single load, said current sharing method comprising:

detecting an output voltage level from each of said plurality of power supply modules;

comparing each of said output voltage levels with a master reference voltage level;

detecting a voltage differential between an output voltage level of a given one of said plurality of power supply modules and said master reference voltage level;

in response to detecting a voltage differential between an output voltage level of a given one of said plurality of power supply modules and said master reference voltage level, adjusting an output current from said given one of said power supply modules such that current sharing is provided among said plurality of power supply modules; and within each of said power supply modules:

providing an alternate voltage source; and comparing said master reference voltage level with a voltage level at said alternate voltage source to generate an internal reference voltage level applicable to said common voltage adjustment node, wherein said internal reference voltage level is maintained lower than said master reference voltage level.

8. The current sharing method of claim 7, further comprising the step of setting and adjusting said master reference voltage level at a higher level than each of said internal reference voltage levels.

* * * * *